United States Patent [19]

Gawne et al.

[11] Patent Number: 5,286,319
[45] Date of Patent: Feb. 15, 1994

[54] ULTRASONIC PLEAT WELDING MACHINE

[75] Inventors: Kenneth Gawne, Oak Ridge; Gordon Thompson, Clinton, both of Tenn.

[73] Assignee: Verosol USA Inc., Pittsburgh, Pa.

[21] Appl. No.: 849,456

[22] Filed: Mar. 11, 1992

[51] Int. Cl.$^5$ ............................................... B31F 1/00
[52] U.S. Cl. .................. 156/73.1; 156/275.1; 156/580.1; 156/474; 156/204; 156/292; 264/25; 425/174.2
[58] Field of Search ................... 156/73.1, 73.4, 275.1, 156/580.1, 444, DIG. 38, 474, 204, 292; 264/25, 23; 425/174.2

[56] References Cited

U.S. PATENT DOCUMENTS

| | | | |
|---|---|---|---|
| 4,943,454 | 7/1990 | Neff | 428/12 |
| 5,120,376 | 6/1992 | Hong | 156/73.1 |

OTHER PUBLICATIONS

CAMCO of Commercial Cam Division, Emerson Power Transmission Co. Catalog No. 103, dated Jun. 1988.
Branson Ultrasonics Corporation Data Sheet No. 900-2.
Branson Ultrasonics Corporation Data Sheet No. 900-3.

*Primary Examiner*—David A. Simmons
*Assistant Examiner*—Mark De Simone
*Attorney, Agent, or Firm*—Buchanan Ingersoll

[57] ABSTRACT

An improved machine for welding pleats on fabric that employs a plurality of toothed wheels to index the fabric one pleat at a time. A pusher is positioned between each of a selected pair of adjacent wheels. The pushers are sized and configured to be capable of pushing selected pleats from the wheels to a proper position between the weld stack and anvil for welding. Additionally, the welding stacks are independently pneumatically actuated so that each welding stack may apply the proper welding pressure. A series of air blowers directs a flow of air under a just-welded pleat stripping it from the anvil.

19 Claims, 7 Drawing Sheets

ULTRASONIC PLEAT WELDING MACHINE

BACKGROUND OF THE INVENTION

1. Field of the Invention

This invention relates generally to ultrasonic welding machines and, more specifically, to ultrasonic welding machines for forming tabs on pleats of woven and non-woven fabric

2. Description of the Prior Art

It is generally known in the blind industry to fold blind fabric into pleats. It is further known that certain advantages may be obtained by providing a tab along pleats of the fabric. These advantages include improved pleat retention, that is the tab allows the fabric to retain its shape and prevents the fabric from losing its creases and going flat. Also, the cording holes and the cords themselves may be located through the tab and can thus be "hidden" from view. It is known to form this tab by ultrasonic welding.

Figure 9:
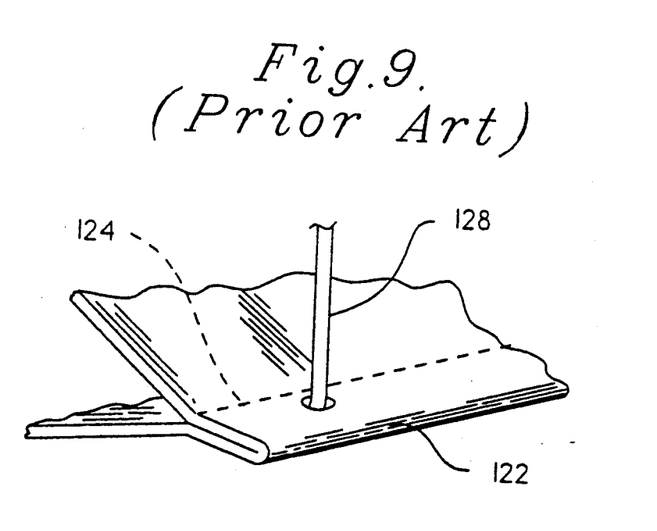
FIG. 9 is a perspective view of a portion of a tabbed pleated shade of the conventional type.

Such tabbed pleats are described in U.S. Pat. No. 4,974,656 to Judkins. FIG. 9, which is a prior art figure derived from a figure of the Judkins patent, depicts such a tabbed pleated shade. Prior art FIG. 9, which includes reference numerals, shows a section of fabric creased so as to form a pleat that extends longitudinally along the section of fabric. A weld line 124 is placed along the length of the pleat at some distance from the creased edge of the fabric so as to form a tab 122 that lies longitudinally along the fabric, parallel with the pleat. Window blind lift cords 128 may then be placed through holes on the tab of the pleated shade. Although welding is the preferred manner of forming the pleat tabs, other means such as sewing or gluing are also common in the industry.

The methods used in the industry for forming tabs on pleats have included the use of machines having a long, toothed spindle. These spindles index the fabric forward pleat by pleat into position to be welded. It is also known in the industry to employ machines that have two or more thinner spindles rather than one long spindle to index the fabric when forming tabs.

A known method of forming a tab on the pleat is through the use of ultrasonic welding. In ultrasonic welding, the overlapping sections of material to be welded are placed upon an anvil. The anvil supports the material during welding.

Located above the material to be welded are the stacks. A stack consists of a converter, a booster and a horn in series, with the horn facing the material. The horn has the function of delivering the energy to the material to be welded. The stacks are lowered to apply a clamping force on the material between the horn and anvil, which results in the material between the horn and anvil being put under pressure. At some point while this welding pressure is mounting, the welding commences. A problem that is present in the art is structure deflection during the welding operation. If the anvil warps or deflects during the welding operation, the welding pressure will vary thus creating inconsistent and possibly defective welds. Similarly, the welding pressure may vary if the supports to which the stacks are mounted deflect.

Once welding is complete, the stack must be moved away from the material so that the welded pleat can be removed from the anvil and the next pleat indexed forward for welding. If the fabric is not positively situated on the anvils during welding, a missed weld or a weld not in its proper location on the blind fabric could result. Thus, an effective system for positively situating the fabric in position for welding is needed.

Typically, stacks are actuated mechanically and mechanical means such as springs are normally employed to insure proper welding pressure. However, if the springs are worn, incorrectly adjusted or otherwise provide too much or too little tension then too much or too little pressure is applied to the material during welding. Too little welding pressure results in bad welds, while excessive welding pressure can cause premature wear to the stack components. Thus, a means of individually regulating the welding pressure of a stack is needed. Another problem with spring loaded systems is that whenever there is a change in any physical characteristic of the fabric, the system may need to be adjusted.

SUMMARY OF THE INVENTION

We provide an improved machine for ultrasonically welding tabs onto pleats of fabric. The improved welding machine employs a plurality of toothed index wheels. A sheet of pleated fabric is placed over the index wheels so that pleats are successively positioned within respective grooves between the index wheel teeth. The index wheels are fixed parallel to one another on a shaft with a space between each wheel. In the space between each index wheel lies a pusher arm. Each pusher is connected to a common shaft. Additionally, the welding machine has a plurality of welding stacks consisting of a converter, a booster, a half-wave extension and a horn that are independently pneumatically actuated so that each stack may apply the proper pressure during welding. Lying below the welding stacks are the anvils.

A pleat is carried along the index wheels to where the pleat is adjacent the welding stacks and anvils. The pushers then swing and push the pleat, accurately positioning the pleat between the welding stack and anvil. The horns are actuated and the weld is performed forming a tab on the pleat. The pushers are swung away from the pleat, the horns are retracted from the pleat and an air blower directs a flow of air under the pleat stripping it from the anvil. The index wheels then index that pleat forward allowing the next pleat to be in position for welding and the process is repeated.

DESCRIPTION OF THE PREFERRED EMBODIMENT

Generally, the present ultrasonic pleat welder 10 has as its primary components an indexing assembly 12, a material pusher assembly 14, a welding assembly 16, an incoming material tray 18 and an outgoing material tray 20. As will be described more fully below, indexing assembly 12, material pusher assembly 14 and welding assembly 16 cooperate to pick up a sheet of pleated fabric that is located in incoming material tray 18, advance pleats of that fabric to the proper location for welding, position the pleats accurately before performing the welding operation, and then advance the welded pleats to outgoing material tray 20.

Referring first to FIGS. 1 thru 4, indexing assembly 12 has a plurality of index wheels 22 mounted about their centers to an index wheel shaft 24. Index wheels 22 are mounted such that the longitudinal axis of index wheel shaft 24 is perpendicular to the radii of each wheel 22. Index wheels 22 are rigidly mounted along the length of index wheel shaft 24 parallel to one another with a space 26 provided between each wheel 22. The preferred number of index wheels 22 is forty-five (45), but the number of index wheels may vary with the width of the fabric being processed and the stiffness of the fabric. The total width of index wheels 22 and spaces 26 of the preferred indexing assembly 12 can accommodate fabric widths of up to ninety inches.

Figure 1:
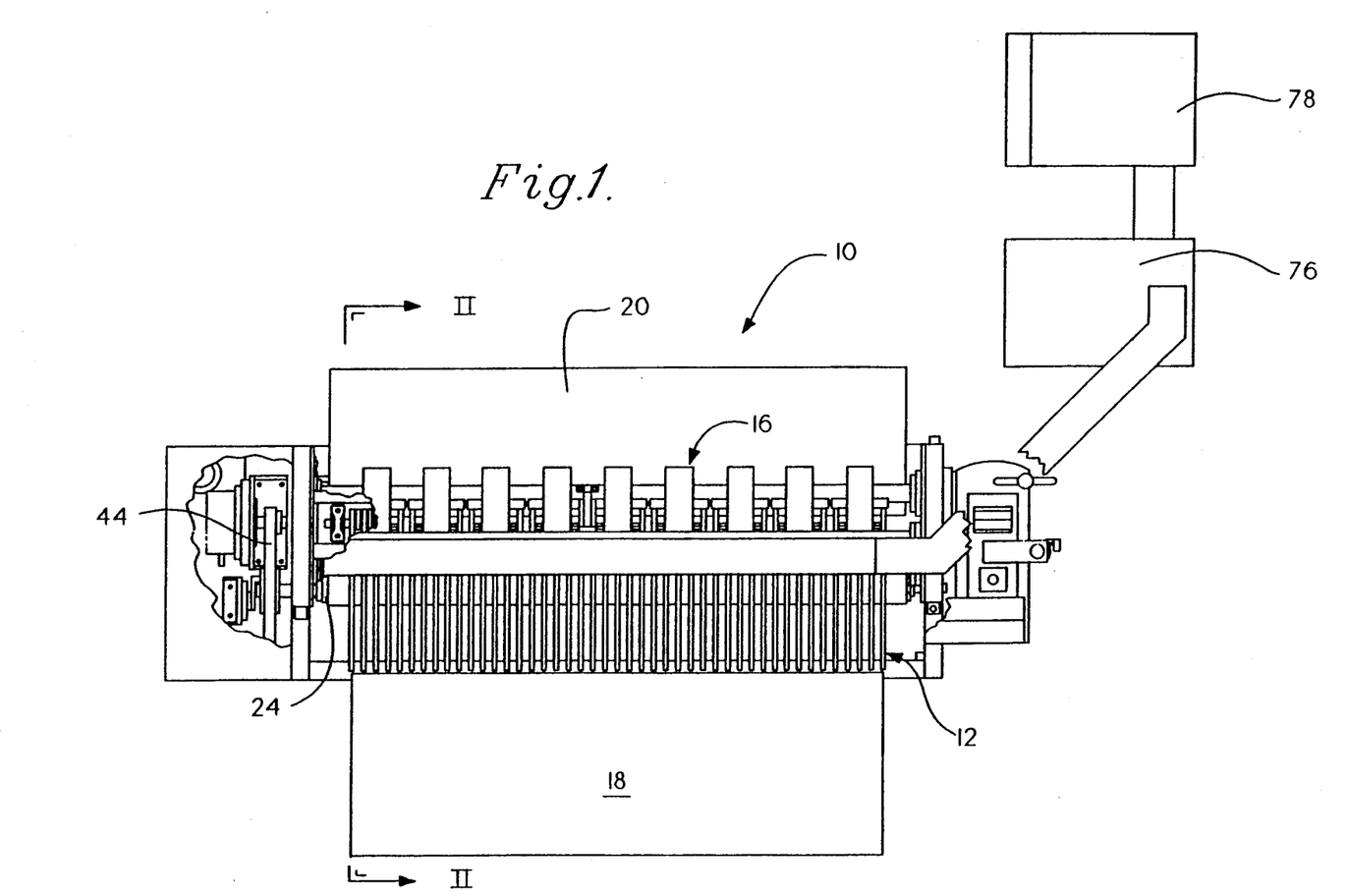
FIG. 1 is a plan view of a preferred embodiment of the present invention.
Figure 2:
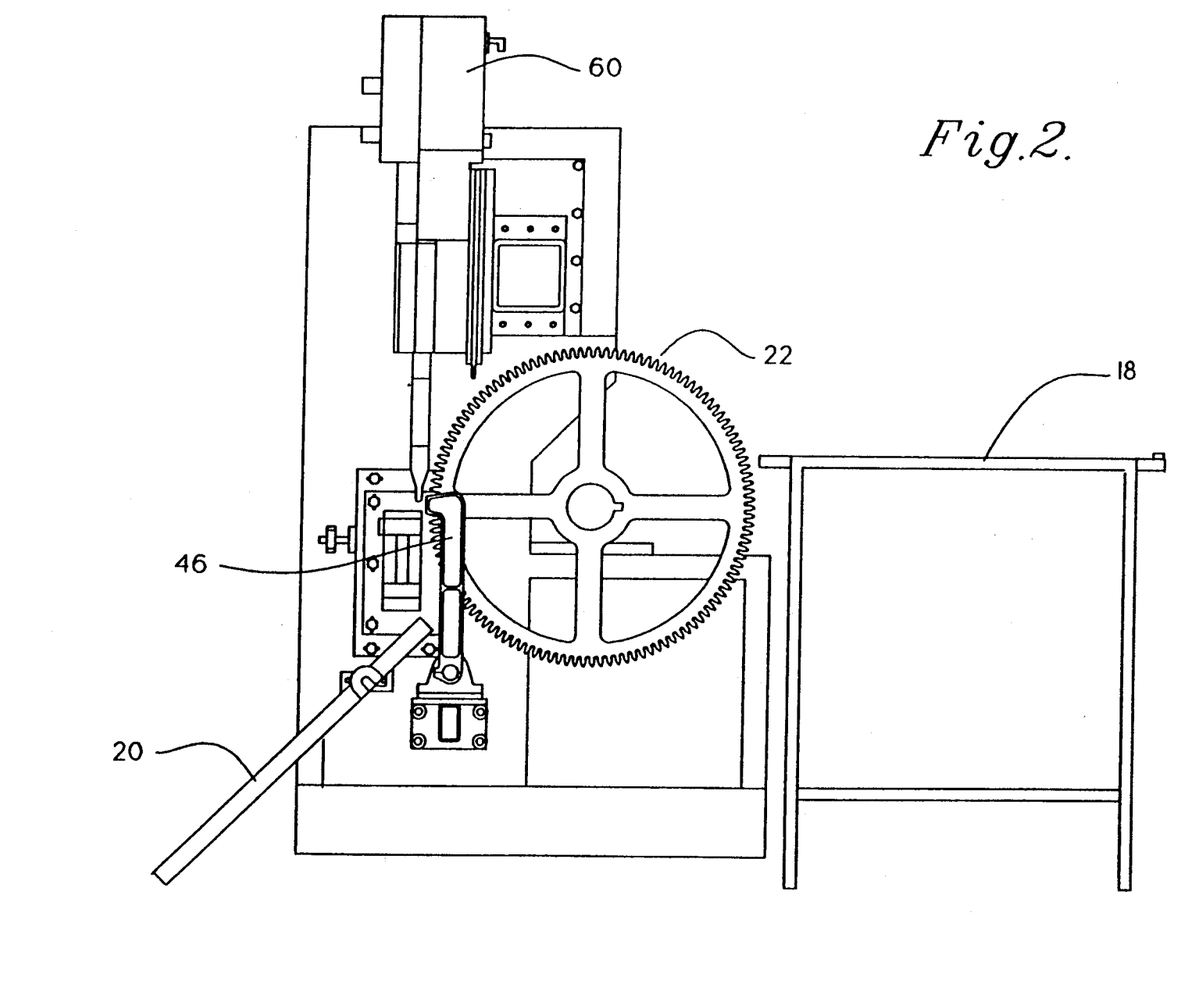
FIG. 2 is a view taken along the line II—II of FIG. 1.
Figure 3:
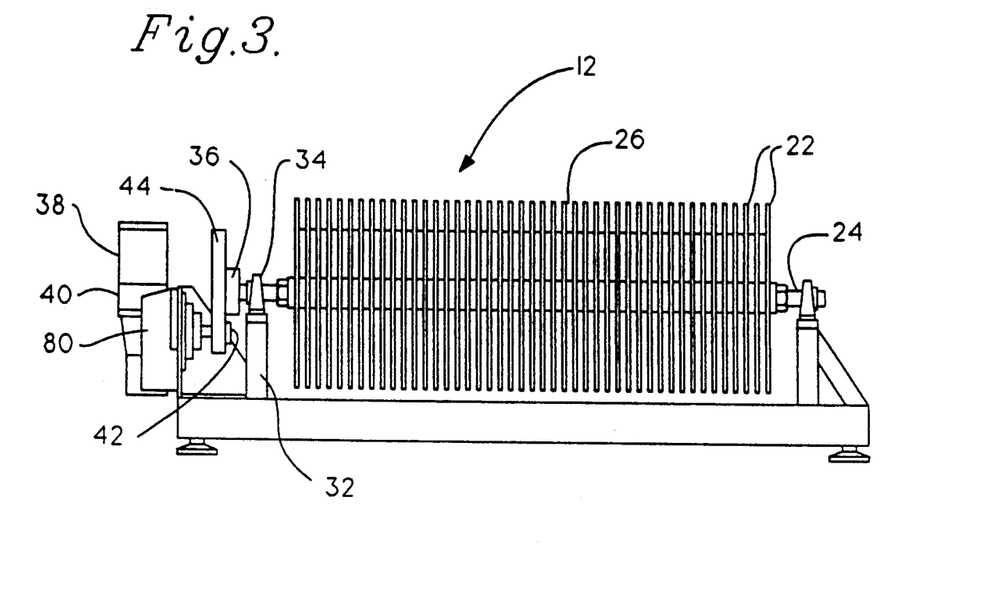
FIG. 3 is a front view of the preferred index assembly.
Figure 4:
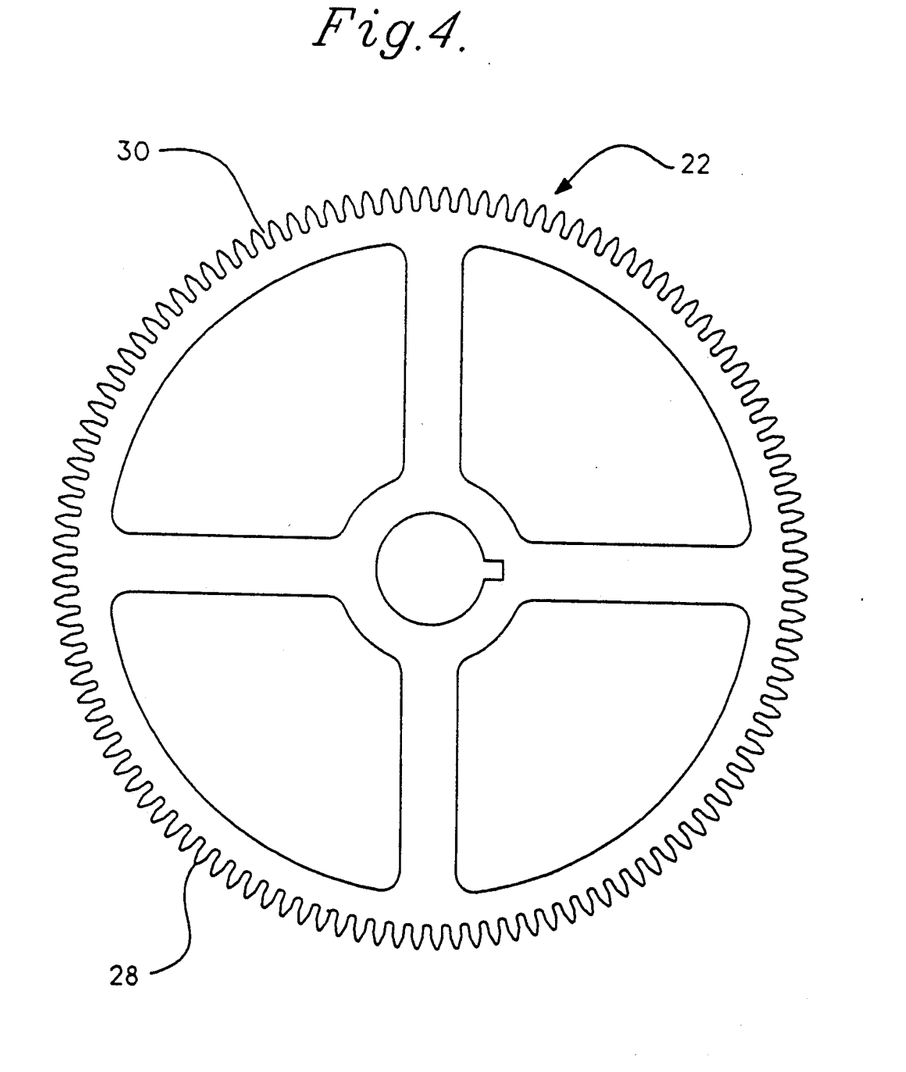
FIG. 4 is a side view of the index wheel.

As can be seen best in FIG. 4, each wheel 22 has a plurality of teeth 28 directed radially outward from the circumferential outer edge of wheel 22. There is formed between each tooth 28 a groove 30. The diameter of index wheels 22 as well as the shape and depth of grooves 30 and teeth 28 are designed so as to allow for efficient fabric pickup to be maintained. Additionally, the outside profile of each wheel 22 must be smooth and free of burrs or other projections that could snag the fabric. It is preferred that index wheels 22 are fabricated from aluminum. Index wheels 22 are mounted on index wheel shaft 24, index wheels 22 are oriented so that each groove 30 of one wheel 22 is co-linear with a groove 30 of adjacent wheels 22. Index wheel shaft 24 is rotatably fixed to index shaft supports 32 by index wheel pillow blocks 34. A sprocket 36 is mounted to one end of index wheel shaft 24. An indexer 80 is driven by an indexer motor 38 driven through a clutch/brake 40. Indexer 80 is designed to receive a steady rotational input and provide an intermittent rotational output. For the specific requirements of the present invention, the indexer output is a rotational routine having an acceleration phase, a deceleration phase and a dwell phase. A model RDM indexer from CAMCO Emerson Power Transmission is particularly well suited for this application. A drive sprocket 42 is attached to the indexer 80 output. Drive sprocket 42 and index wheel shaft sprocket 36 lie on the same plane. A continuous timing belt 44 is wrapped around and engages drive sprocket 42 and index wheel shaft sprocket 36. Thus, as indexer motor 38 and indexer clutch/brake 40 cooperate to drive indexer 80, indexer 80 rotates drive sprocket 42 through its rotational routine. Timing belt 44 in turn rotates index wheel shaft sprocket 36. Index wheel shaft sprocket 36 then turns index wheel shaft 24 which turns index wheels 22 through the indexer's rotational routine.

Figure 5:
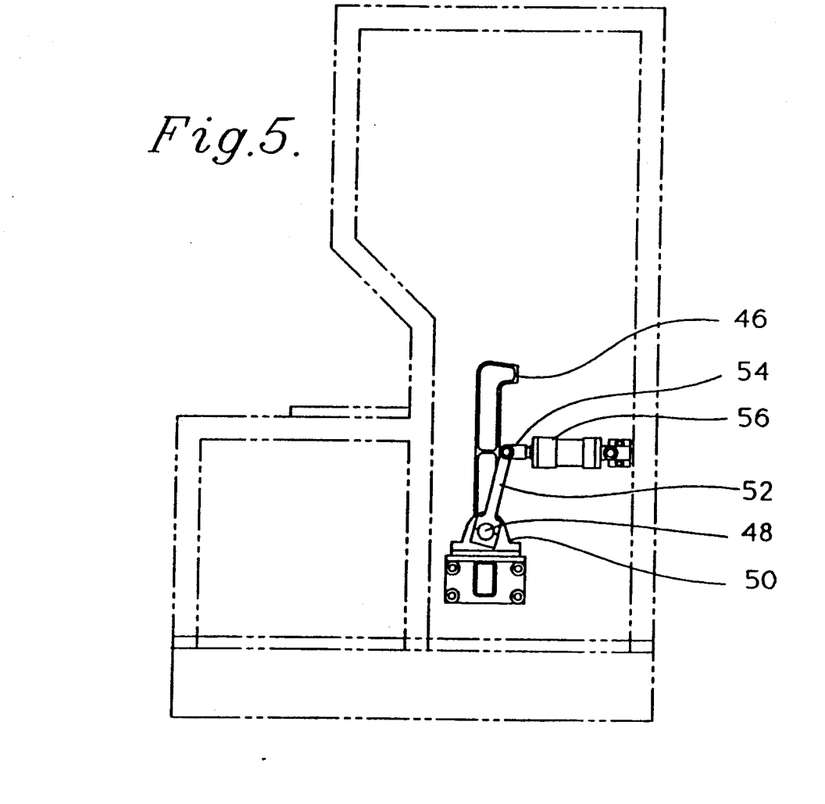
FIG. 5 is a side view of the preferred pusher assembly.
Figure 6:
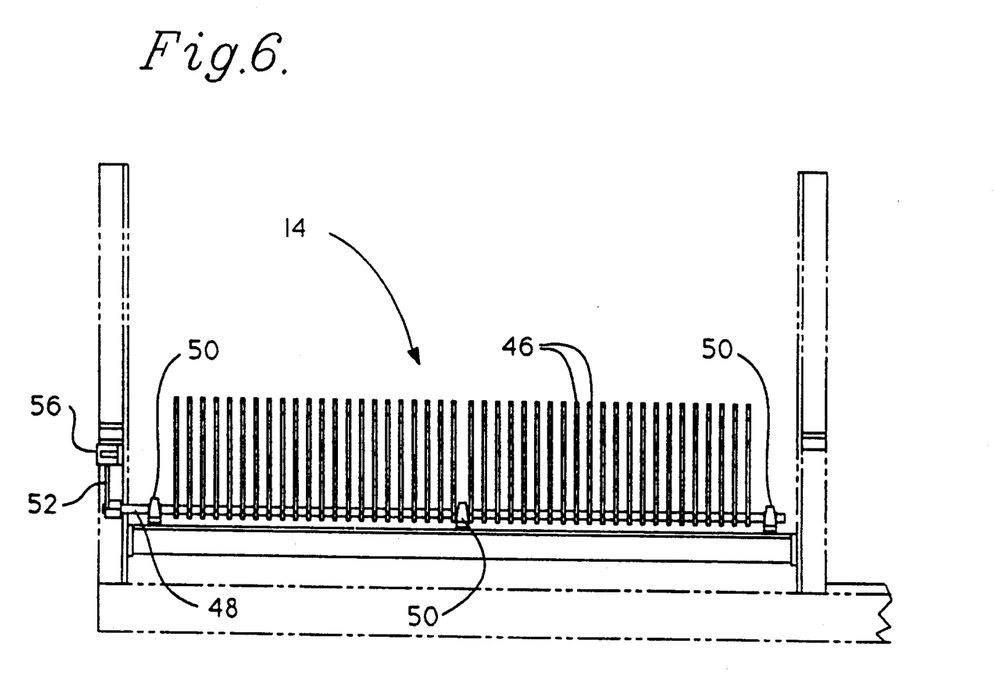
FIG. 6 is a back view of the preferred pusher assembly.

Referring next to FIGS. 5 and 6, pusher assembly 14 has a plurality of elongated pushers 46 fixed along the length of pusher shaft 48. Pusher shaft 48 is rotatably fixed to the structure of pleat welder 10 by pusher shaft pillow blocks 50. Pushers 46 extend radially outward and generally upward from pusher shaft 48 so that as pusher shaft 48 is rotated about its longitudinal axis, pushers 46 move arcuately about the longitudinal axis of pusher shaft 48. The number of pushers 46 is preferably equal to the number of spaces 26 between index wheels 22. In the preferred embodiment, forty-four (44) pushers 46 are employed. Pusher shaft 48 is positioned so that its longitudinal axis is parallel to the longitudinal axis of index wheel shaft 24. Pusher shaft 48 is positioned so that the arcuate path of travel of each pusher 46 passes through a corresponding space 26 between index wheels 22. Pusher shaft 48 is further positioned so that index wheel shaft 24 will not interfere with the arcuate travel of pushers 46. A connecting arm 52 is fixed to pusher shaft 48. Connecting arm 52 is connected to a clevis 54 by any convenient pivot means such as a pin or hinge. Clevis 54 is provided to offer a means of pivotably connecting the connecting arm 52 to a linearly translating air cylinder 56. Air cylinder 56 is secured to the structure of pleat welder 10. Thus, as air cylinder 56 extends, clevis 54 pushes connecting arm 52 causing connecting arm 52 to travel arcuately and causing pusher shaft 48 to rotate. As pusher shaft 48 rotates, pushers 46 are swung arcuately in the rotational direction of travel of connecting arm 52. Similarly, when air cylinder 56 retracts, pushers 46 are caused to move arcuately in the opposite direction. Pushers 46 are preferably lightweight as a lightweight set of pushers minimizes vibrations in the system which minimizes cycle time thus improving efficiency. A thin-walled aluminum frame is the preferred design for the pushers 46. The activation of air cylinder 56 is synchronized with the indexing of the fabric so that once a pleat is indexed into position, air cylinder 56 retracts causing pushers 46 to push the pleat positively forward so that it is situated precisely for welding. Once the welding has been completed, air cylinder 56 extends causing the pushers 46 to move away from the fabric pleat.

Referring again to FIGS. 1 and 2, an incoming material tray 18 is placed to the rear of and proximate to index wheels 22. The width of incoming material tray 18 is preferably sized to accommodate the widest sheet of fabric to be welded. The top of incoming material tray 18 is preferably positioned above index wheel shaft 24 and adjacent to index wheels 22. Outgoing material tray 20 is positioned to the front of and proximate to index wheels 22. The width of outgoing material tray 20 is preferably large enough to accommodate the widest sheet of fabric to be welded. The receiving edge of outgoing material tray 20 is preferably positioned below and at an angle to the anvils 70.

Figure 7:
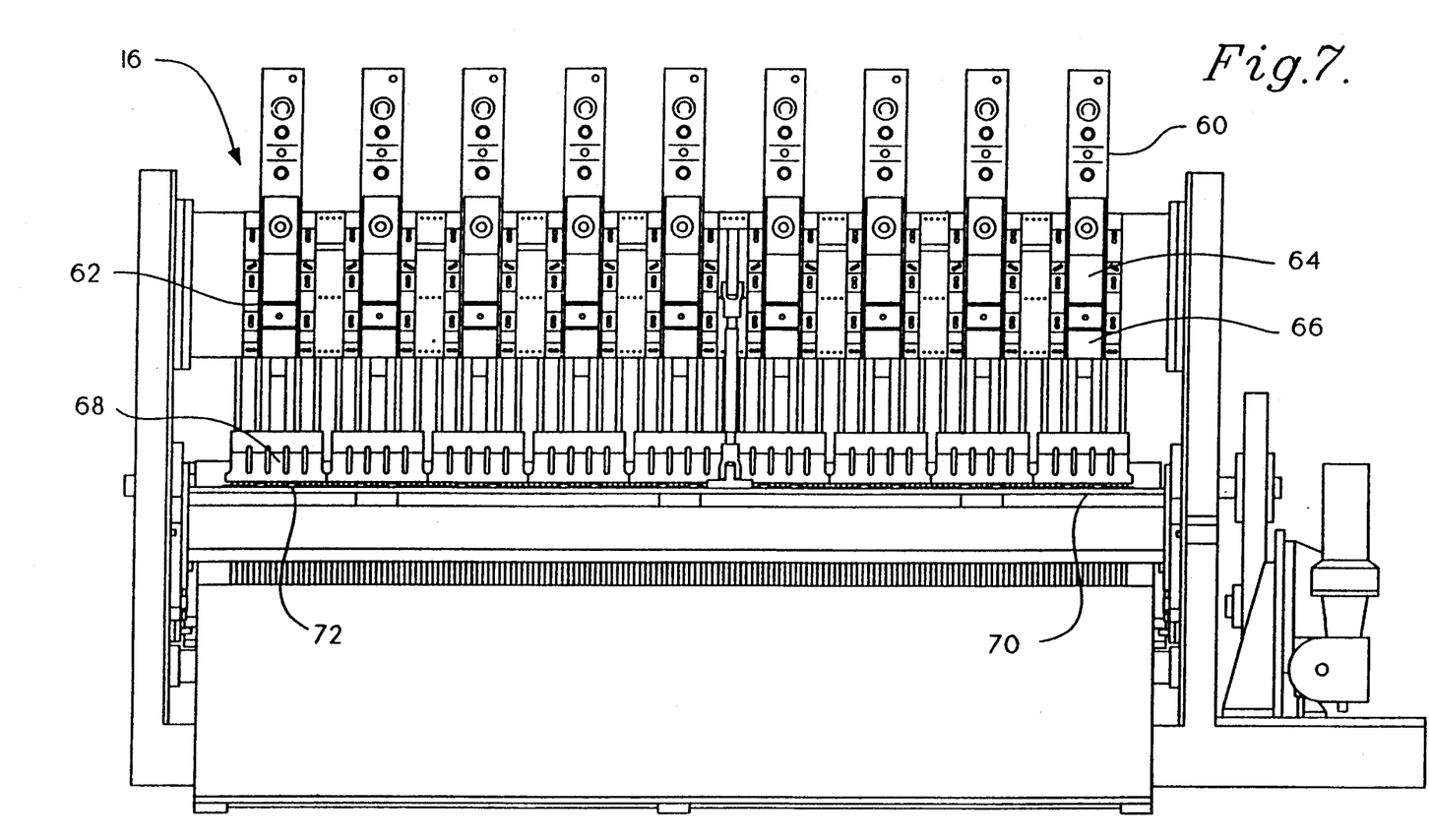
FIG. 7 is a back view of the preferred embodiment shown in FIG. 1.
Figure 8:
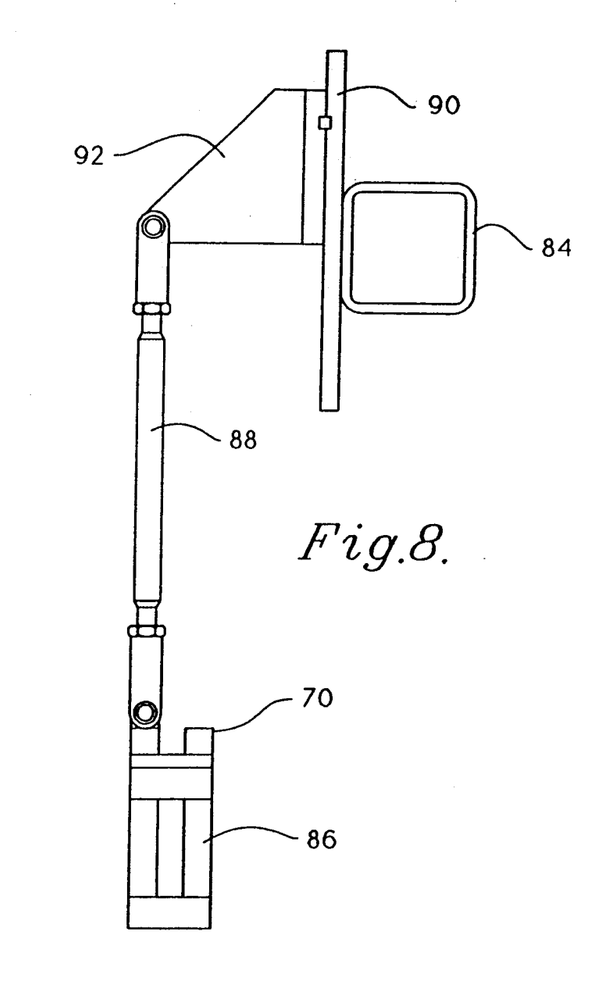
FIG. 8 is a side view of anvil and weld stack support.

Referring next to FIGS. 7 and 8, welding assembly 16 includes anvils 70 and actuators 60 connected to stacks 62. Each stack 62 includes a converter 64, a booster 66 and a horn 68 arranged in a series. Each stack 62 has a corresponding anvil 70 located below it. The stacks 62 of the preferred embodiment also include a half-wave extension 67. The half-wave extension 67 is a section of sonically-tuned material, preferably titanium capable of carrying the signal from the booster 66 to the horn 68. Half-wave extension 67 is designed to be of a sufficient length so that the actuator mounting does not obstruct the travel of the incoming fabric on index wheels 22. The stacks 62 are arranged longitudinally in a line in the pleat welder 10. Actuators 60 are pneumatically driven to either raise or lower stacks 62. Actuators 60 can be individually activated or deactivated, therefore, when fabrics of less than the maximum width are welded, only the number of stacks 62 necessary to weld the fabric are actuated. Branson Ultrasonics 900 series welder actuators are particularly well suited for this application. The preferred frequency used in the stack equipment operation is 20 kHz. A series of air blowers 72 are located in front of anvils 70 and when activated direct a flow of air over anvils 70 back toward index wheels 22. The air flow is directed under the blind fabric, lifting and directing the fabric from the anvils 70. The welder power supplies 76 and machine controls 78 are located in separate cabinets remote from index assembly 12, pusher assembly 14 and weld assembly 16.

In operation, a sheet of pleated fabric is loaded onto incoming material tray 18. The fabric is placed upon index wheels 22 so that a pleat is placed within an aligned series of grooves 30 of index wheels 22. The following pleat is placed within the following aligned series of grooves 30 of index wheels 22 and so on. Clutch/brake 40 engages and disengages with indexer motor 38, delivering power to indexer 80 so as to rotate index wheels 22 one tooth at a time. The fabric is carried to the back of index wheels 22, and a pleat is brought adjacent to anvils 70. Air cylinder 56 then retracts causing pushers 46 to push the pleat over anvil 70 and retain the pleat in that location. Actuators 60 then cause stacks 62 to move down so that horn 68 is applying the correct clamping force upon the pleat and anvil 70. When horn 68 is thus upon the pleat and anvil 70, welding stacks 62 are said to be in welding position. The weld is then performed. Actuators 60 then cause stacks 62 to be moved away from the anvil, releasing the pleat. Pushers 46 are retracted back away from the anvils. Blowers 72 are then activated and the air flow moves the pleat from anvil 70 and back toward index wheels 22. Index wheels 22 are then rotated so that the next pleat is in position and the process is repeated. After fabric is welded, it is indexed forward onto outgoing material tray 20.

The number of index wheels 22 and pushers 46 utilized in the invention is generally a matter of design choice. However, the more stiff the fabric to be welded, the less support and hence fewer pushers 46 are needed to accurately position the fabric. When the fabric to be welded is less stiff, more pushers are employed so as to not allow the fabric to be incorrectly positioned which could cause the weld to deviate from a straight line or be welded at an improper location on the pleat.

Referring to FIG. 8, the structure of the pleat welding machine is designed to limit deflection during the welding operation. The actuators are secured by means of a welder mounting which consists of a actuator mounting plate 90 and a rectangular tube 84. Common actuator mounting plate 90 is attached to rectangular tube 84 and both are secured to the surrounding structure of the pleat welder by any convenient means such as brackets, rivets or bolts. The rectangular tube 84 acts to limit deflection as well as limiting any torsional reaction to the welding operation.

The anvil support has also been designed to limit deflection. An anvil beam 86 extends longitudinally beneath the anvils. The anvil beam is fabricated from plates arranged in a rectangular box configuration.

To further inhibit deflection during the welding operation, a rigid link 88 connects actuator mounting plate 90 and the anvil beam 86. This link 88 is situated at a selected point along the length of the beam 86 and mounting plate 90 so as to reduce the effective length of the supports into two parts. The reduced effective length of the supports reduces the deflection of the supports at any point. A triangular bracket 92 is mounted to actuator mounting plate 90. Link 88 then provides a rigid connection between triangular bracket 92 and anvil beam 86.

Variations of the preferred embodiment could be made. For example, as noted above, the number of index wheels 22 and pushers 46 are generally open to a certain amount of design preference within limits dictated by the stiffness of the fabric to be welded. Furthermore, the number of pushers 46 could be less than the number of spaces 26 between wheels 22. Thus, the invention could be embodied with a pusher placed in every other space, or every third space, or any number of pushers equal to or less than the number of spaces could be used.

As an alternative design, pusher shaft 48 is eliminated and the pushers are mounted to a linear slide. The linear slide is actuated by any convenient means such as by pneumatics or a solenoid.

Although an air blower 72 is preferred to strip the pleat from anvils 70, other means such as a mechanical stripper could be used to perform the same function. The mechanical stripper could be driven by any convenient means such as by an air cylinder.

As another alternative embodiment, a servo motor could be equipped with a drive sprocket and coupled directly to index wheel shaft sprocket 36.

Also, although the preferred stack equipment is operating at 20 kHz, other frequencies may be used.

Furthermore, although index wheel pillow blocks 34 and pusher shaft pillow blocks 50 are disclosed, any rotatable mounting means can be employed to secure index wheel shaft 24 to index wheel shaft supports 32 and to secure pusher shaft 48 to the structure of pleat welder 10.

While certain present preferred embodiments have been shown and described, it is distinctly understood that the invention is not limited thereto but may be otherwise embodied within the scope of the following claims.

We claim:

1. A pleat welding machine comprising:
   (a) a welding assembly containing at least one ultrasonic weld stack and an anvil between which welds are made; and
   (b) advancing means for advancing pleated material from a supply area to the weld assembly for welding said material, said advancing means comprising:
      (i) a plurality of spaced apart toothed wheels sized and configured to carry the pleated material, and
      (ii) a plurality of pushers, each pusher positioned between a selected pair of adjacent toothed wheels and being sized and configured to be capable of pushing selected pleats from the toothed wheels to a position between the weld stack and anvil for welding.

2. The improved pleat welding machine of claim 1, further comprising a pneumatic system having actuators which independently actuate the welding stacks into and out of a welding position.

3. The improved pleat welder of claim 1 wherein said pushers are fixed to a rotatable shaft.

4. The improved pleat welder of claim 3 wherein said rotatable shaft is fixed to an air cylinder.

5. The improved pleat welder of claim 1 wherein said weld stacks have a converter, a booster and a horn arranged in a series.

6. The improved pleat welder of claim 5 further comprising a half-wave extension disposed between and connecting said booster and said horn.

7. The improved pleat welder of claim 1 wherein said pushers are made of aluminum.

8. The improved pleat welder of claim 1 wherein said advancing means has forty-five index wheels.

9. The improved pleat welder of claim 1, further comprising a system for stripping welded pleats from said anvil, said system being positioned adjacent said welding assembly.

10. The improved pleat welder of claim 9 wherein said system for stripping welded pleats from said anvil is a series of air blowers that direct a flow of air under said pleat.

11. The improved pleat welder of claim 2 wherein said actuators are supported by an actuator support, and said anvil is supported by an anvil support.

12. The improved pleat welder of claim 11 wherein said anvil support and said actuator support are connected by a rigid link.

13. A method for ultrasonically welding tabs on pleats of fabric comprising the steps of:

a) indexing a pleated blind panel one pleat at a time toward an anvil, said blind panel being indexed on a plurality of parallel index wheels;

b) pushing each said pleat to be welded into a proper position for welding on said anvil, said pleat being pushed by a plurality of pushers, one of said pushers being disposed between each said index wheel;

c) welding said pleat; and d) removing said welded pleat from said anvil.

14. The method of claim 13 wherein each pleat is welded by at least one independent, pneumatically actuated welder.

15. The method of claim 13 wherein said welded pleat is removed from said anvil by an air flow directed from a set of blowers.

16. The method of claim 13 wherein said fabric is indexed on a series of spaced, parallel toothed wheels, said wheels having a groove between each two adjacent teeth and each said pleat to be welded being situated in a colinear series of grooves.

17. The method of claim 16 wherein each pleat to be welded is pushed into a proper position for welding by one or more pushers, one each of said pushers being disposed in at least one space between said toothed wheels.

18. The method of claim 17 wherein said pushers are rigidly fixed to a rotating shaft.

19. The method of claim 18 wherein said rotating shaft is connected to an air cylinder.

* * * * *